United States Patent Office 3,490,018
Patented Jan. 13, 1970

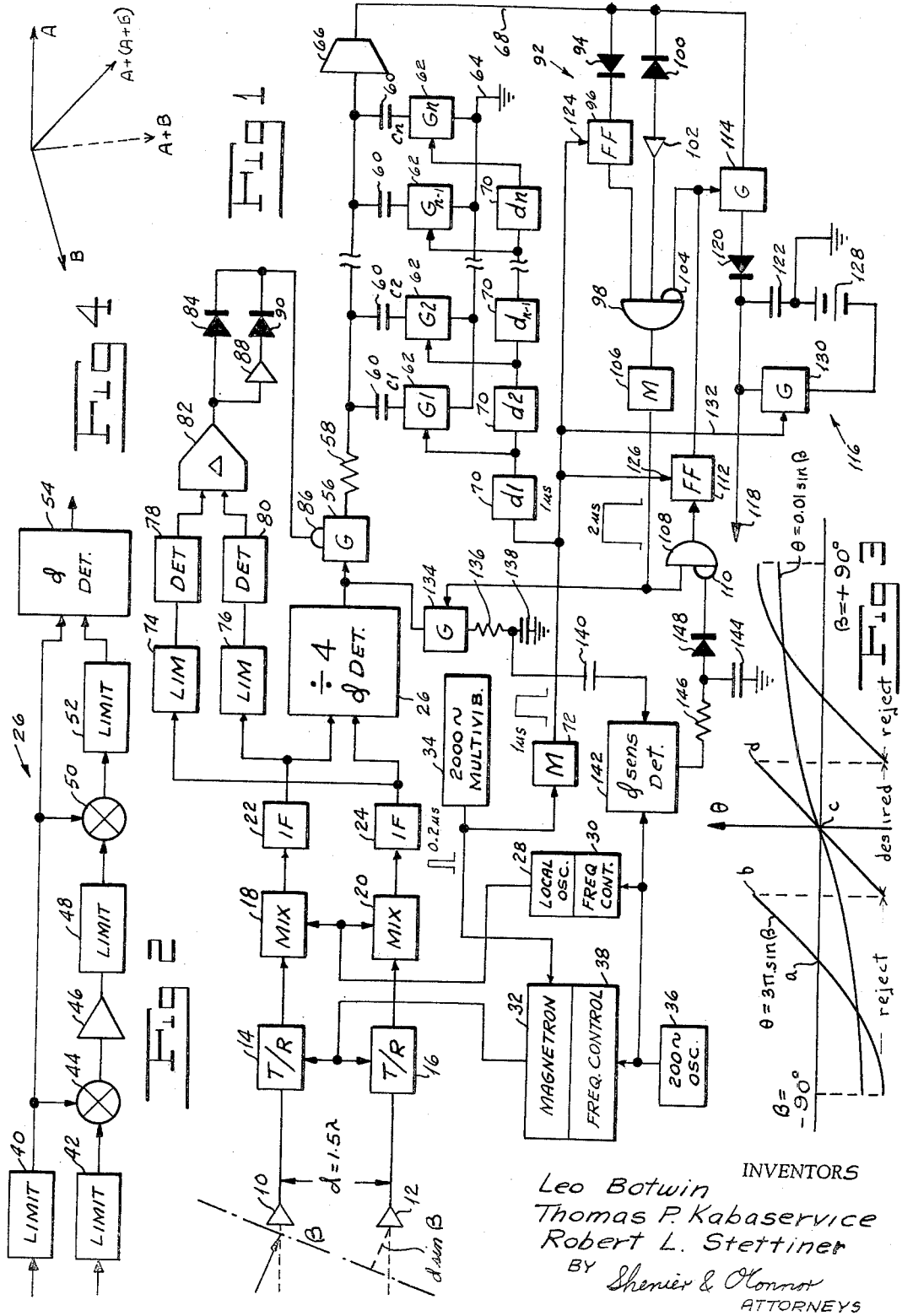

1

3,490,018
PHASE INTERFEROMETER AMBIGUITY
RESOLUTION SYSTEM
Leo Botwin, Port Chester, N.Y., Thomas P. Kabaservice, New Haven, Conn., and Robert L. Stettiner, Lexington, Mass., assignors to United Aircraft Corporation, East Hartford, Conn., a corporation of Delaware
Filed July 24, 1967, Ser. No. 655,642
Int. Cl. G01s 9/02
U.S. Cl. 343—16
6 Claims

ABSTRACT OF THE DISCLOSURE

A phase interferometer radar system employing a frequency agile transmitter. The spacing between the receiving horns is large so that there results a large sensitivity resultant signal. With the spacing greater than one half the wave length of the return signals, however, there is an ambiguity since the pulses received by the two horns have relative phase shifts exceeding 360°. The receiver includes a phase detector which provides and output indicative of the relative phase shift between received pulses within an interval of 360°. The ambiguity is resolved by a gating circuit which is responsive to a plus to minus detector and a phase-sensitive detector. The plus to minus detector provides an output when the polarity of the output of the phase detector goes from positive to negative. The phase-sensitive detector provides an output indicative of the polarity of the phase relationship of the AC component of the phase detector output and the transmitter frequency modulating signal. The gating circuit provides an output to a display on the concurrence of a reversal in polarity of the phase detector output with an out-of-phase relationship between the AC component of the phase detector and the transmitter frequency modulaitng signal.

Background of the invention

It is desirable in a phase interferometer radar system to have a large spacing between the receiving horns since the magnitude of the resultant signal is directly proportional to the spacing. However, if the spacing between the horns is more than one half the wave length of the return, then the plot of the electrical delay versus elevation angle is multiple-valued for a given elevation angle. That is, the detected electrical delay may correspond to one of a number of different elevation angle values. It is usual to operate over the central region of the detected return and we accordingly wish to select that region in an unambiguous manner.

In one particular phase interferometer radar system the transmitted frequency is modulated about a nominal transmitted frequency to reduce the effect of unwanted inputs. This freqeuncy modulation results in a modulation of the electrical delay betweeen the upper and lower receiver horns. We have discovered that the output of the phase detector has a characteristic at the edges of the desired region which permits us to select that region without ambiguity.

Summary of the invention

We have invented a system for resolving ambiguity in a phase interferometer radar system. Our system permits us to select the desired portion of the return without ambiguity. Our system accomplishes this result in a relatively simple and expeditious manner.

One object of our invention is to provide a system for resolving ambiguity in a phase interferometer radar.

Another object of our invention is to provide a system for unambiguously passing only a desired portion of the detected signal to the system display.

2

A further object of our invention is to provide a phase interferometer radar ambiguity resolution system which is relatively simple.

Other and further objects of our invention will appear from the following description.

In general our invention contemplates the provision of an ambiguity resolution system for a phase interferometer radar employing frequency agility in which we detect the concurrence of a reversal in polarity of the detector output with an out-of-phase relationship between the AC component of the detector output and the transmitter frequency modulating signal to gate the detector signal to the display.

Brief description of the drawings

In the accompanying drawings which form part of the instant specification and which are to be read in conjunction therewith and in which like reference numerals are used to indicate like parts in the various views:

FIGURE 1 is a schematic view illustrating one form of our phase interferometer ambiguity resolution system.

FIGURE 2 is a schematic view illustrating the details of one of the components of our phase interferometer radar ambiguity resolution system.

FIGURE 3 is a diagram illustrating the components of the phase detector output of our phase interferometer radar ambiguity resolution system.

FIGURE 4 is a diagram illustrating the mode of operation of the arrangement shown in FIGURE 2.

Description of the preferred embodiments

Referring now to FIGURE 1 of the drawings, the phase interferometer radar to which we apply our system includes a pair of vertically spaced antenna horns 10 and 12 coupled, respectively, to transmit-receive devices 14 and 16 of any suitable type known to the art. When a return is being received, the devices 14 and 16 feed respective mixers 18 and 20 providing respective intermediate frequency signals which are fed by amplifiers 22 and 24 to provide the inputs to a detector 26.

A local oscillator 28 having a rapid response frequency control 30 provides the local frequency for the mixers 18 and 20. A magnetron 32 is adapted to be keyed by a multivibrator 34 of a frequency of, for example, 2 kc. with pulses having a width of about 0.2 μs. to supply transmitted pulses to the devices 14 and 16.

In our ambiguity resolution system we modulate the frequency of the output of the magnetron 32 at a relatively low frequency of about 200 cycles by applying the output of an oscillator 36 to the frequency control section 38 of magnetron 32. In order to avoid errors in the output we also apply the output of oscillator 36 to the frequency control 30 of the local oscillator 28.

In order to ensure a linear response to the inputs applied to detector 26, we use a divide-by-four phase detector indicated generally by the reference character 26 in FIGURE 2. Detector 26 includes respective limiters to which we couple the IF signals. We apply the outputs of the two limiters 40 and 42 to an adder 44 which adds the input quantities in a one-to-one relationship. Considering the two inputs to the limiters 40 and 42 as two vectors A and B shown in FIGURE 4, the output of the adder 44 will give us a measure of the vector $A+B$ indicated in FIGURE 4. We amplify the output of adder 44 by an amplifier 46 and apply the amplifier output to another limiter 48. We apply the output of limiter 48, which represents the vector $A+B$ scaled to the same scale as the output of limiter 40 representing the vector A, as well as the vector A to another adder 50, the output of which represents the vector $A+(A+B)$ of FIGURE 4. We then pass the output of adder 50 to the limiter 52 and apply the output of limiter 52 together with the output of limiter 40 to a phase detector 54. We select all of the limiters 40, 42, 48 and 52 to provide the same amplitude output signal and we select adders 44 and 50 to add their input quantities in a one-to-one relationship. It will be seen that the phase detector 26 thus produces an output signal which is representative of one-quarter of the phase difference between the radiation received by the respective feed horns 10 and 12.

A normally conductive gating circut 56 passes the output of the detector 26 to a resistor 58 which applies the signal to a plurality of capacitors 60 identified, respectively, as C1, C2 ... Cn, where n is the number of elevation angle lines to be provided. Each of the capacitors 60 has the same value and together with the resistor 58 provides a filter having a suitable time constant. We connect each of the capacitors 60 in series with a respective gate 62 between the resistor 58 and a ground line 64. An isolating amplifier 66 such, for example, as an emitter follower connects the capacitor output terminals to a channel 68. While we have illustrated only four capacitors 60, it will readily be understood by those skilled in the art that in practice we provide a much larger number, as many as 500 such capacitors being employed.

We apply the phase detector signal from gate 56 to the respective capacitors 60 with a predetermined time relationship between the reflected radiation resulting from respective transmitted pulses by means of a plurality of delay networks 70 associated with the respective gating circuits 60. Keying pulses from multivibrator 34 actuate a one-shot multivibrator 72 to provide output pulses each having a width of about 1 $\mu$s. The output pulse from the multivibrator 72 is fed to the first delay network 70 which, after a predetermined delay of about 1 $\mu$s., for example, applies the pulse to the gating circuit associated with the first capacitor. We may, for example, designate the respective gating circuits as G1, G2 ... Gn and the delay networks as d1, d2 ... dn. The operation of this system will readily be understood by those skilled in the art. 1 $\mu$s. after a transmitted pulse the output of the multivibrator 72 is applied to gate G1; 2 $\mu$s. after a transmitted pulse the output of multivibrator 72 is applied by network d2 to gate G2 and so forth down the line.

We provide our arrangement with means for preventing unwanted information, such as noise, from being coupled to the capacitor 60 by the gate 56. We couple the respective inputs to the detector 26 to limiters 74 and 76 which feed respective detectors 78 and 80 which, in turn, provide inputs to a differential amplifier 82. It will be seen that as long as the magnitudes of the input signals are above a certain level, the outputs from the two detectors 78 and 80 will be the same so that the difference amplifier 82 produces no output. If, however, one of the signals is less than a predetermined level, the detectors 78 and 80 will have different outputs and amplifier 82 will produce an output. If that output is positive, it is applied directly by a diode 84 to an inhibiting terminal 86 of gate 56. If the amplifier output is negative, it is first inverted by an inverting amplifier 88 and then applied to terminal 86 by a diode 90. In this manner we prevent noise from being coupled to the capacitors 60.

In a phase interferometer radar of the type to which we apply our system, the electrical phase difference between a signal received by the horn 10 and that received by the horn 12 as a result of a wave front indicated by the dot-dash line in FIGURE 1 and approaching from a direction indicated by the arrow in FIGURE 1 is given by the expression (1) $$\theta = \frac{2\pi d}{\lambda} \sin \beta$$

where $\theta$ is the electrical phase difference, $\lambda$ is the wave length of the received radiation, $d$ is the vertical spacing between the horns 10 and 12 and $\beta$ is the elevation angle with reference to a direction straight ahead. Also in the system shown when we sinusoidally modulate the frequency at a rate $\omega_a$ using a modulation factor of (2) $$a = \frac{f\ \text{max.} - f\ \text{min.}}{f\ \text{max.} + f\ \text{min.}}$$

we can write (3) $$\lambda = \frac{C}{f_o(1+a \sin \omega_a t)} = \frac{\lambda_o}{1+a \sin \omega_a t}$$

since $\lambda = C/f$ and (4) $$\theta = \frac{2\pi d}{\lambda_o}(1+a \sin \omega_a t) \sin \beta$$

If we take $a = 0.001$ and let $$d = \frac{3}{2}\lambda_o$$

then (5) $$\theta = 3\pi \sin \beta + 0.01 \sin \beta \sin \omega_a t$$

Referring now to FIGURE 3, we have shown the components of the output of the phase detector 26 in response to the phase difference as indicated by Equation 5. It will be seen that for the range of values of $\beta$ from $-90°$ to $+90°$, the plot of the first term of Equation 5 has discontinuities. This is inherent in the nature of the detector. As a result of these discontinuities there is an inherent ambiguity in the system. It will be appreciated that for a particular value of phase detector output, there are three possible values of elevation angle, one in the central region of the plot and two others outside the central region. Generally the desired operating range of the radar is within the central region illustrated in FIGURE 3. It will be seen that while the first term of Equation 5 has discontinuities over the range of elevation angles from $+90$ to $-90$, no such discontinuities in the second term exist. We take advantage of this fact in order to feed only information in the central region of the display of our system.

Specifically, we first provide a plus to minus detector, indicated generally by the reference character 92, for indicating that the output of the buffer amplifier 66 has gone from a plus value to a minus value. It will be appreciated in an airborne radar looking at the ground that as the return is received, we go from a negative elevation angle toward a positive elevation angle or from left to right as viewed in FIGURE 3. Our positive-to-negative detector includes a diode 94 adapted to apply a positive signal on channel 68 to a flip-flop 96 to cause the flip-flop to produce an output which we apply to an AND circuit 98. A second diode 100 applies a negative signal on channel 68 to an inverting amplifier 102 which provides a second input for the AND circuit 98. Circuit 98 includes an inhibiting input terminal 104.

Considering the signal on channel 68, as we begin to receive radiation the signal will go from a negative value to the left of point $a$ in FIGURE 3 and ultimately will become positive, thus triggering the flip-flop 96 to provide a first input to the circuit 98. The signal continues positive until at point $b$ on FIGURE 3 it suddenly drops to a negative value. This negative signal is inverted by amplifier 102 to provide the second input for the AND circuit 98. Assuming that no inhibiting signal is applied to terminal 104 AND circuit 98 provides an output to trigger a one-shot multivibrator 106 to provide an output pulse having a duration of for example 2 $\mu$s. This pulse provides an input for an AND circuit 108 having an inhibiting input terminal 110. Assuming that no signal is applied to the inhibiting terminal 110 the output of AND circuit 108 triggers a flip-flop 112 to apply a signal to a gating circuit 114 to couple the signal on channel 68 to the input circuit, indicated generally by the reference character 116, of the vertical deflection channel 118 of the display. The input circuit 116 includes a diode 120 and a capacitor 122, which we initially charge in a manner to be described to a negative potential slightly greater than the greatest negative elevation angle signal to permit the negative elevation angle information to pass to the display.

Information continues to be fed to the display until the capacitor 122 has charged to a positive value corresponding to that at the point *d* in FIGURE 3. At that point another discontinuity occurs and the signal drops to a negative value. Owing to the presence of diode 120 and since capacitor 122 now carries a positive charge, this undesired information will not be passed to the display.

Upon the occurrence of the next transmitted pulse, multivibrator 72 applies its pulse to the reset terminal 124 of flip-flop 96 and to the reset terminal 126 of flip-flop 112 to prepare this flip-flop for the information next to be received. We connect a battery 128 having its positive terminal connected to ground and a gating circuit 130 across capacitor 122. At the time a pulse is transmitted, a channel 132 applies the output pulse of multivibrator 72 to gating circuit 130 to cause the gate to connect battery 128 across capacitor 122 to charge the capacitor to a negative potential slightly greater than the greatest negative elevation angle return to prepare circuit 116 to pass negative elevation angle information to channel 118 in the manner described.

It may occur that we do not receive information representing the sudden charge in potential of the phase difference signal occurring at point *b*. If that happens there is a similar change occurring at point *d*. From the structure thus far described, this occurrence would cause undesired information to be passed to the channel 118. We take advantage of the characteristic of the AC component of the phase difference information to prevent this occurrence. The pulse produced by multivibrator 106 is applied to a gating circuit 134 to pass a sample of the output of phase detector 26 to a storage arrangement comprising a resistor 136 and a capacitor 138. A high-pass filter 140 couples the AC component of the stored phase information to one terminal of a phase-sensitive detector 142. We apply the output of oscillator 36 to the other terminal of the phase-sensitive detector 142. Whenever the phase angle is negative, the AC component of the output of detector 26 is out of phase with the modulating signal produced by oscillator 36. Contrariwise, when the phase angle is positive, the AC component of the output of detector 26 is in phase with the modulating signal. The detector 142 produces a negative output signal whenever the AC component is out of phase with the signal from oscillator 36 and a positive signal whenever the AC component is in phase with the signal from oscillator 36. We store this information on a capacitor 144 by means of a resistor 146. A diode 148 couples a positive signal to inhibiting terminal 110.

Under the conditions described above, when the signal on channel 68 goes from a positive value to a negative value at point *b*, the AC component of the output of detector 26 is out of phase with the signal on oscillator 36 and detector 142 puts out a negative signal so that no inhibiting signal is applied to terminal 110 and the system operates in the intended manner described above. On the other hand, if the return is not received until after point *b* and the signal on channel 68 goes from positive to negative at point *d*, at this time the AC component of the output of detector 26 is in phase with the signal from oscillator 36 and detector 142 produces a positive output to apply an inhibiting signal to terminal 110 so that no information is coupled to the channel 118.

In operation of our system, when multivibrator 34 triggers the magnetron 32 to provide a burst of transmitted energy, the multivibrator 72 applies its pulse to flip-flop 96 and to flip-flop 112 to reset both circuits. At the same time gate 130 is rendered conductive to permit capacitor 122 to be initially charged to a negative potential so that the first received negative elevation angle information will be passed to the display. When the return is received, phase detector 26 provides elevation angle information which normally is passed to the string of capacitors 60 through gate 56 to provide output elevation angle information on channel 68. If for any reason the received signal is below a certain level, then gate 56 is inhibited in the manner described above.

Flip-flop 96 normally provides no output signal. However, as the input information passes through the point *a* on the curve shown in FIGURE 3, the diode 94 triggers the flip-flop to provide an input for the AND circuit 98. When ultimately point *b* is reached, the information on channel 68 suddenly drops to a negative value to cause diode 100 and inverter 102 to provide the second input signal for AND circuit 98. With no inhibiting signal at terminal 104, the AND circuit causes multivibrator 106 to put out a pulse which, in the absence of an inhibiting signal at 110, passes through circuit 108 to trigger flip-flop 112 to provide an output pulse for enabling gating circuit 114 to pass information on channel 68 to the circuit 116. This information continues to pass to the deflection channel 118 until point *d* is reached, at which time the signal on channel 68 drops to a negative value. Owing to the fact that at this time capacitor 122 carries a positive signal, diode 120 cannot pass the elevation angle information to the channel 118. It will be noted that at the time just after point *b* when flip-flop 112 is triggered, the AC component of the elevation angle information, which component is stored in capacitor 138, is out of phase with the modulating signal of oscillator 36 so that the phase-sensitive detector 142 provides a negative output signal which will not inhibit AND circuit 108. The triggering of flip-flop 112 at point *b* applies a signal at the inhibiting input 104 of AND circuit 98 to prevent multivibrator 106 from again actuating sampling gate 134 at point *d*.

As has been explained, it may happen that the information up to point *b* is lost. If that occurs it would be thought that gate 114 would be rendered conductive since the elevation angle information from a point just beyond point *b* goes first from negative to positive at point *c* and then back to negative at point *d*. While that sequence would cause multivibrator 106 to provide an output pulse, that pulse cannot pass to flip-flop 112 since AND circuit 108 is disabled at that time. This will be apparent from the fact that over the portion of the curve beyond point *c*, the AC component of the output of detector 26 is in phase with the signal from oscillator 36 so that detector 142 provides a positive going output signal which is applied to terminal 110 to inhibit gate 108.

It will be seen that we have accomplished the objects of our invention. We have provided a system for effectively resolving the ambiguity inherent in a phase interferometer radar. Our system unambiguously passes only the desired portion of the detected signal to the system display. Our arrangement is relatively simple for the result achieved thereby.

It will be understood that certain features and subcombinations are of utility and may be employed without reference to other features and subcombinations. This is contemplated by and is within the scope of our claims. It is further obvious that various changes may be made in details without departing from the spirit of our invention. It is, therefore, to be understood that our invention is not to be limited to the specific details shown and described.

Having thus described our invention, what we claim is:

1. A phase interferometer radar system including in combination means for transmitting radar pulses, means including a pair of spaced elements for receiving reflected pulses, the pulses received by said elements having relative phase shifts exceeding 360°, first means for precisely determining relative phase shift between received pulses within an interval of 360°, the first means providing an output which cyclically repeats for successive 360° intervals of relative phase shift, an alternating current source, means responsive to the source for successively changing the frequency of pulses transmitted, a phase-sensitive detector, means coupling the output and the source to the detector, and means responsive to the detector for determining when the output of the first means is within a given interval.

2. A system as in claim 1 in which the means coupling the output comprises a gate.

3. A system as in claim 1 in which the means coupling the output comprises a gate and means responsive to said output for actuating the gate.

4. A system as in claim 1 in which the output comprises a sawtooth waveform exhibiting a rapid retrace and in which the means coupling the output comprises a gate and means for momentarily actuating the gate upon retrace of the sawtooth.

5. A system as in claim 1 in which the output comprises a sawtooth waveform exhibiting a rapid retrace from one polarity to an opposite polarity and in which the means coupling the output comprises a gate and means responsive to a change in the output from said one polarity to said opposite polarity for momentarily actuating the gate.

6. A system as in claim 1 in which the detector provides a reversible polarity output and in which the determining means comprises a gate and means coupling the first means to the gate and means responsive to a certain polarity output of the detector for actuating the gate.

References Cited

UNITED STATES PATENTS 3,317,910   5/1967   Hausz _____ 343—16 X

RICHARD A. FARLEY, Primary Examiner

U.S. Cl. X.R.

343—17.2